US011923607B2

(12) United States Patent
Moore et al.

(10) Patent No.: US 11,923,607 B2
(45) **Date of Patent: *Mar. 5, 2024**

(54) MICROWAVE TRANSITION DEVICE FOR TRANSITIONS FROM AIR-FILLED WAVEGUIDE TO SOLID WAVEGUIDE WITH RADIATING APERTURE ANTENNA

(71) Applicant: Southwest Research Institute, San Antonio, TX (US)

(72) Inventors: Brad D. Moore, Boerne, TX (US); Yilun Luo, Ann Arbor, MI (US)

(73) Assignee: Southwest Research Institute, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/587,977

(22) Filed: Jan. 28, 2022

(65) Prior Publication Data

US 2023/0246344 A1 Aug. 3, 2023

(51) Int. Cl.
*H01Q 13/24* (2006.01)
*H01P 5/08* (2006.01)

(52) U.S. Cl.
CPC ............ *H01Q 13/24* (2013.01); *H01P 5/082* (2013.01)

(58) Field of Classification Search
CPC ......... H01Q 13/20; H01Q 13/24; H01P 5/082
See application file for complete search history.

(56) References Cited

U.S. PATENT DOCUMENTS 6,155,112 A * 12/2000 Eckert ...................... H01Q 1/40 343/753
11,603,786 B1 * 3/2023 Luo ......................... F01N 3/202
2007/0008212 A1 * 1/2007 Serban ................... H01Q 1/225 342/124

* cited by examiner

*Primary Examiner* — Daniel Munoz
(74) *Attorney, Agent, or Firm* — Livingston Law Firm

(57) ABSTRACT

A transition device for transitioning microwaves from an air-filled waveguide to an antenna. The air-filled waveguide is assumed to have an attachment flange, with the transition device having a compatible transition attachment flange. A rod has an upper portion extending upwardly through the flanges and a lower portion extending downwardly into the air-filled waveguide. The rode is made from a solid piece of high-dielectric material. The rod's outer surfaces of the upper portion (other than its end face) are metal plated, such that the upper portion provides a solid waveguide having a radiating aperture antenna.

18 Claims, 4 Drawing Sheets

MICROWAVE TRANSITION DEVICE FOR TRANSITIONS FROM AIR-FILLED WAVEGUIDE TO SOLID WAVEGUIDE WITH RADIATING APERTURE ANTENNA

TECHNICAL FIELD OF THE INVENTION

This patent application relates to microwave devices, and more particularly to microwave waveguide transitions.

BACKGROUND OF THE INVENTION

Waveguide transitions are radio frequency (RF) devices that provide RF transmission transition between different waveguides or antennae. Some examples of applications for which they are used are in RF/microwave systems, including Wi-Fi, radio, cellular, satellite and other communications, RF/microwave heating in food, chemistry and other industries, and chemical reaction enhancements for emissions aftertreatment, chemical synthesis and various external/internal combustion engines and jet engines.

Some of the major challenges in waveguide transition design are to provide a smooth transition between hollow and solid waveguides or antennae, to achieve high transmission efficiency and low reflection for a wide operating frequency range, and to transmit high power microwave energy.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following invention is directed to a waveguide transition that launches a high-power microwave signal from an air-filled waveguide into a solid waveguide whose end face is a radiating aperture antenna. The transition provides a small-sized and high-performance device that smoothly transitions from different size waveguides or antennae for efficient, wide-band and high-power transmission.

The invention enables using reduced-size waveguides and antennae that can be installed for space-limited applications. The transition may be constructed from materials especially suited to withstand harsh working conditions (high pressure, high temperature, and high chemical reactivity). Examples of such applications are heating chambers, chemical synthesis chambers, aftertreatment reactors, combustion vessels, and internal combustion engine cylinders.

Figure 1:
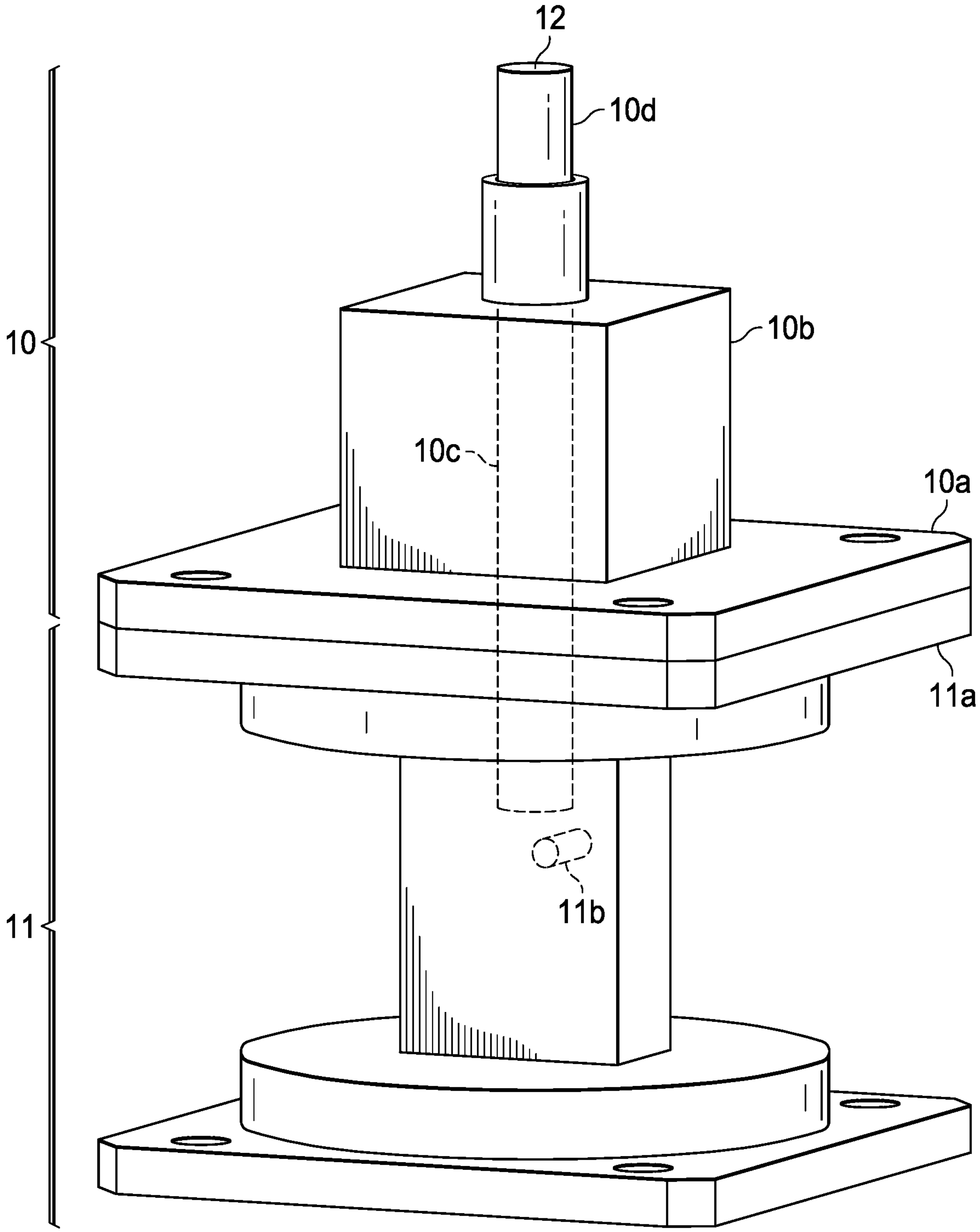
FIG. 1 is a transparent view of a microwave transition in accordance with the invention.

FIG. 1 illustrates a waveguide transition 10 between a waveguide 11 and a solid waveguide/antenna 12. The illustration is a "transparent" view in the sense that a rod portion of transition 10 can be seen through outer walls of transition 10 and waveguide 11. In actual implementation, a chamber portion 10*b* of transition 10 and waveguide 11 have solid walls.

Figure 2:
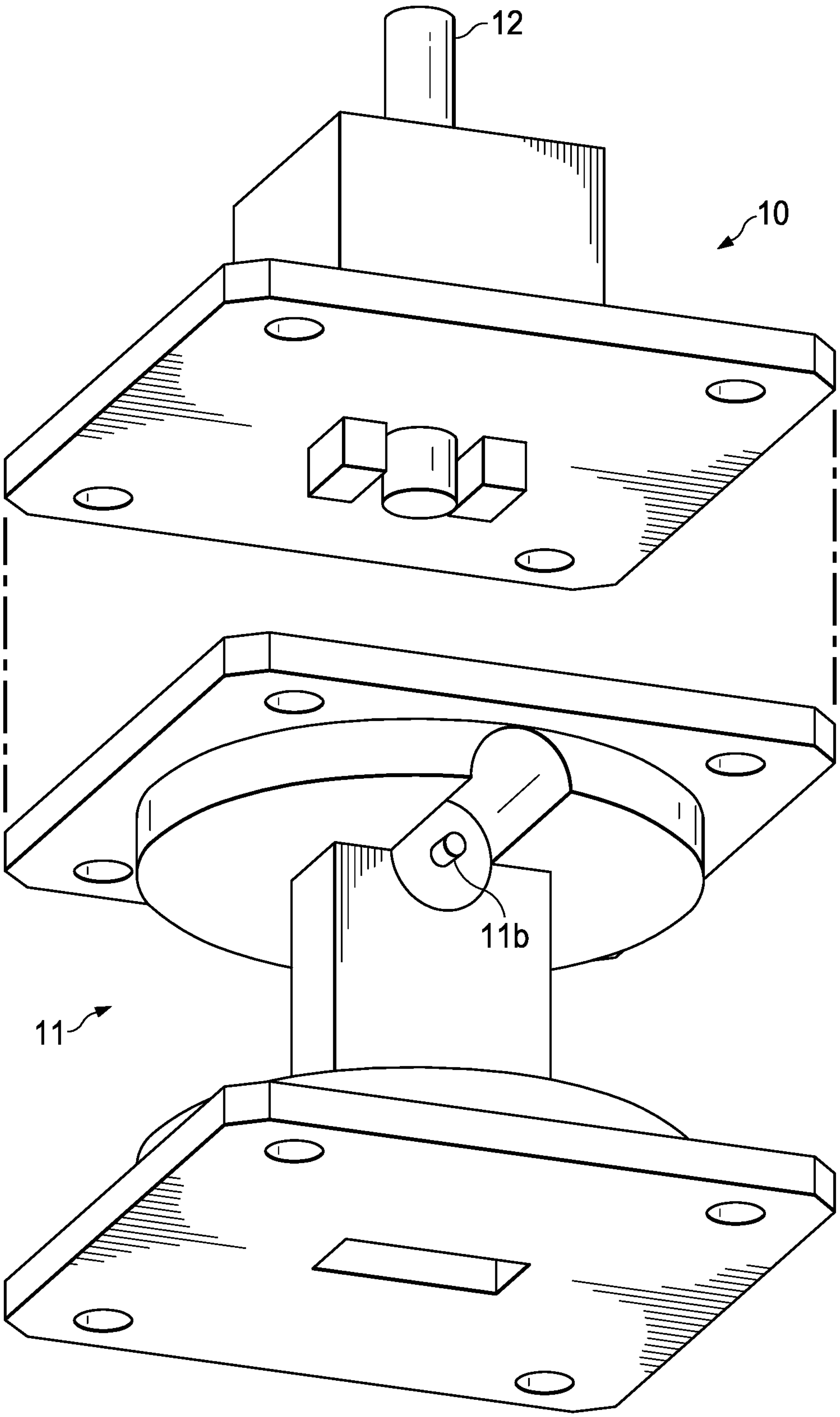
FIG. 2 is a perspective view of the microwave transition.

FIG. 2 is a perspective view, showing transition 10, waveguide 11, and waveguide/antenna 12. As explained below, transition 10 provides a transition between a hollow waveguide, such as waveguide 11, and a solid waveguide 12 with the waveguide 12 having a radiating aperture antenna.

An example of microwave energy transmission for which transition 10 is designed is 8-12 GHz. This distinguishes transition 10 from other transitions, such as for coaxial cable, which are unsuitable for such transmission energy.

In the example of this description, waveguide 11 is a conventional rectangular waveguide. Specifically, waveguide 11 is a straight waveguide section designed for interconnections, having an attachment flange 11*a*. Such waveguide sections are commercially available in various sizes, lengths, and frequency ranges. Examples of typical straight waveguide section configurations are in size ranges from WR-10 to WR-137, lengths from 3 to 12 inches, and frequency ranges of 5.85 GHz to 11.0 GHz in thirteen waveguide bands. These specifications are examples only; the invention is not limited to use with waveguides with these specifications.

Waveguide 11 need not be a straight waveguide; waveguide sections are available with various bends and twists. Furthermore, waveguide 11 need not be rectangular and may be some other hollow (air-dielectric) waveguide, such as an elliptical or circular waveguide.

Waveguide 11 has a tuning screw 11*b* through its wall. This permits fine-tuning of the center frequency of operation. Transition 10 need not cover the full frequency bandwidth of waveguide 11, and tuning screw 11*b* provides a fine-tuning function to optimize the transition performance at a chosen frequency of operation. A target frequency band for antenna 12 may be selected.

Transition 10 comprises an attachment flange 10*a*, a support housing 11*b*, and a ceramic rod 10*c*. Attachment flange 10*a* is "compatible to" the attachment flange 11*a* of waveguide 11, meaning that it is shaped and sized to provide a tight connection to flange 11*a* and has a central waveguide opening. Flanges 10*a* and 11*a* may be provided with bolt holes and may be bolted together. When attached, flanges 10*a* and 11*a* provide a central air passage from waveguide 11 into chamber 11*b*.

Rod 10*c* is a solid piece of high-dielectric material. A suitable material for rod 10*c* is ceramic, specifically, a low loss microwave dielectric ceramic. However, some other homogenous high dielectric constant material could be used. In the example of FIGS. 1 and 2, rod 10*c* is cylindrical, but it could have other cross-sectional geometries.

An upper portion of rod 10*c*, which extends through and above flanges 10*a* and 11*a*, provides the antenna for microwave transmission. The antenna is implemented with a radiating aperture at the end of rod 10*c*. In other words, only the end face of rod 10*c* radiates microwave energy.

Support housing 11*b* is a rigid structure that surrounds some or all of the upper portion of rod 10*c*. It provides support and protection for the upper portion of rod 10*c*. It may be made from a material designed to withstand harsh environments, such as a ceramic.

A lower portion of rod 10*c* extends into waveguide 11. The portion of rod 10*c* that extends into waveguide 11 functions as a matching transformer between the air-filled waveguide mode of waveguide 11 and the solid cylindrical waveguide mode of antenna 12.

The upper portion of rod 10*c* is metal plated. As a result, the metal plating contains a cylindrical waveguide mode within rod 10*c* within cylindrical boundaries. These plated portions of rod 10*c* result in rod 10*c* functioning as a cylindrical waveguide with a radiating aperture antenna. On the lower portion of rod 10*c*, which extends into waveguide 11 there is no such plating. The end faces of rod 10*c* are not plated.

Optionally, to prevent breakage or fracture of ceramic rod 10*c*, a sleeve 10*d* may be attached to chamber 10*b*, in which case, rod 10*c* is inserted through the sleeve. An appropriate material for such a sleeve is brass.

In operation, transition 10 transitions microwave energy from a standard (air-filled) waveguide to a much smaller (dielectric-filled) waveguide whose end face forms a radiating aperture (antenna). In the example of this description, the cross-sectional area rod 10*c* can be approximately one-third that of a conventional circular waveguide. With appropriate higher-dielectric ceramics, the size of rod 10*c* could be made even smaller. An advantage of ceramic materials is that their high strength, melting point, and heat conductivity make them durable as well as suitable for harsh environments.

The small size of transition 10 provides the ability to inject microwave energy into a small structure (such as an engine cylinder), which would not be possible with an air-filled waveguide.

Figure 3:
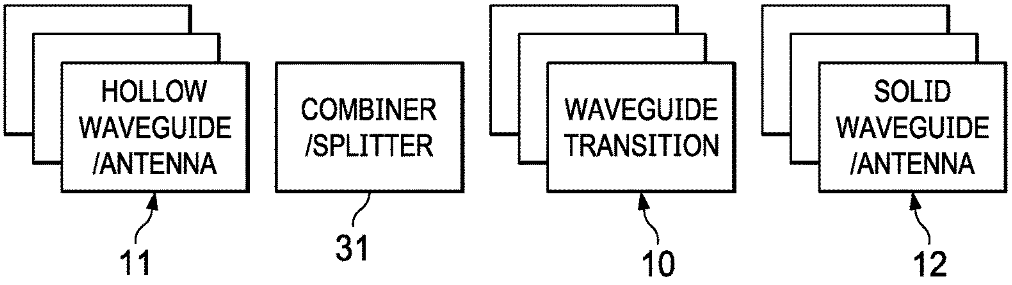
FIG. 3 illustrates how a combiner may be used for multiple waveguide transitions.

FIG. 3 illustrates how multiple transitions 10 can be used with an RF combiner 31 to achieve multiple waveguide transitions. Such combinations can provide high transmission efficiency and low reflection over a wide operating frequency range.

Figure 4:
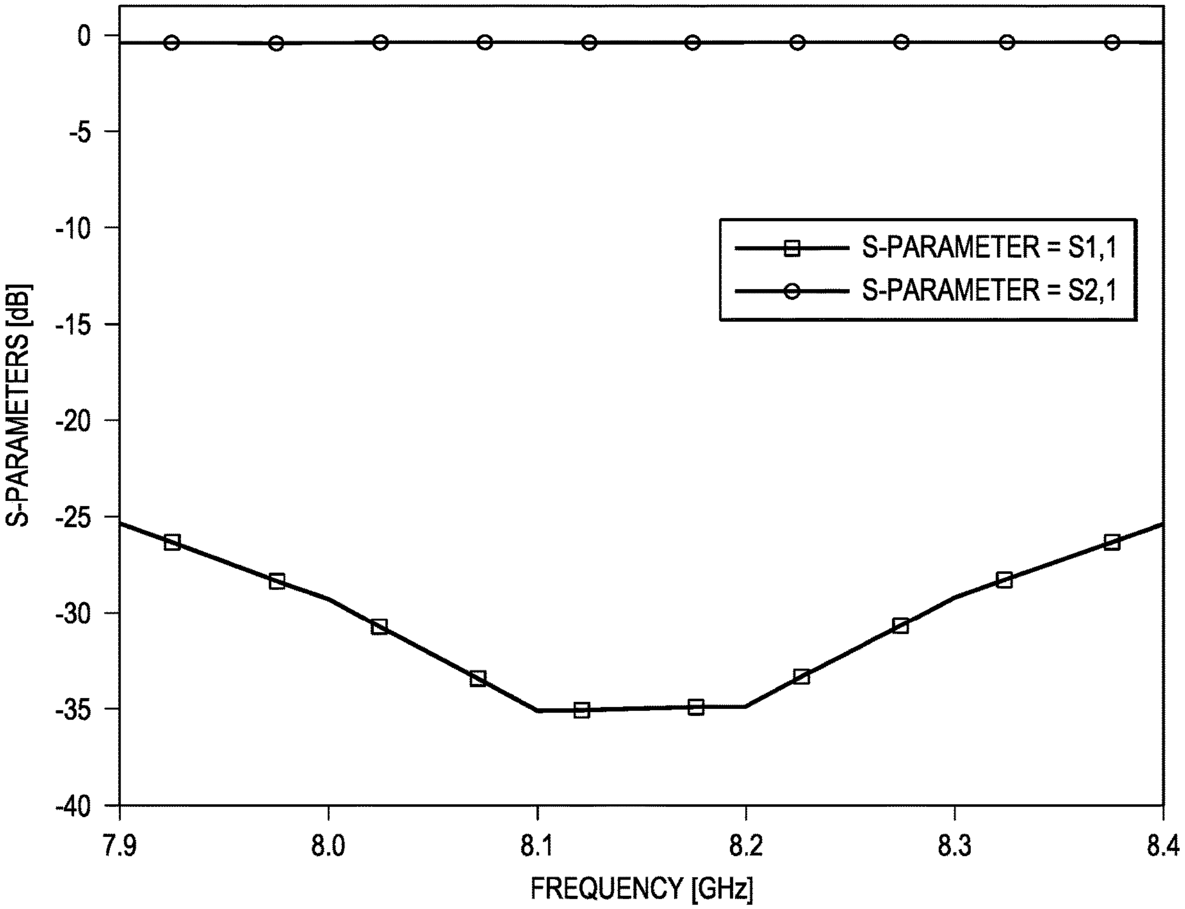
FIG. 4 illustrates experimental results of an example of the microwave transition.

FIG. 4 illustrates experimental results for an example transition, over a frequency range of 7.9 to 8.4 GHz. In the example of FIG. 4, transition 10 was used between a rectangular (WR-112) mode TE-01 waveguide to a ceramic-loaded cylindrical TE-11 mode waveguide. The S-parameters (scattering parameters) S11 and S21 show high transmission efficiency and low reflection.

Figure 5:
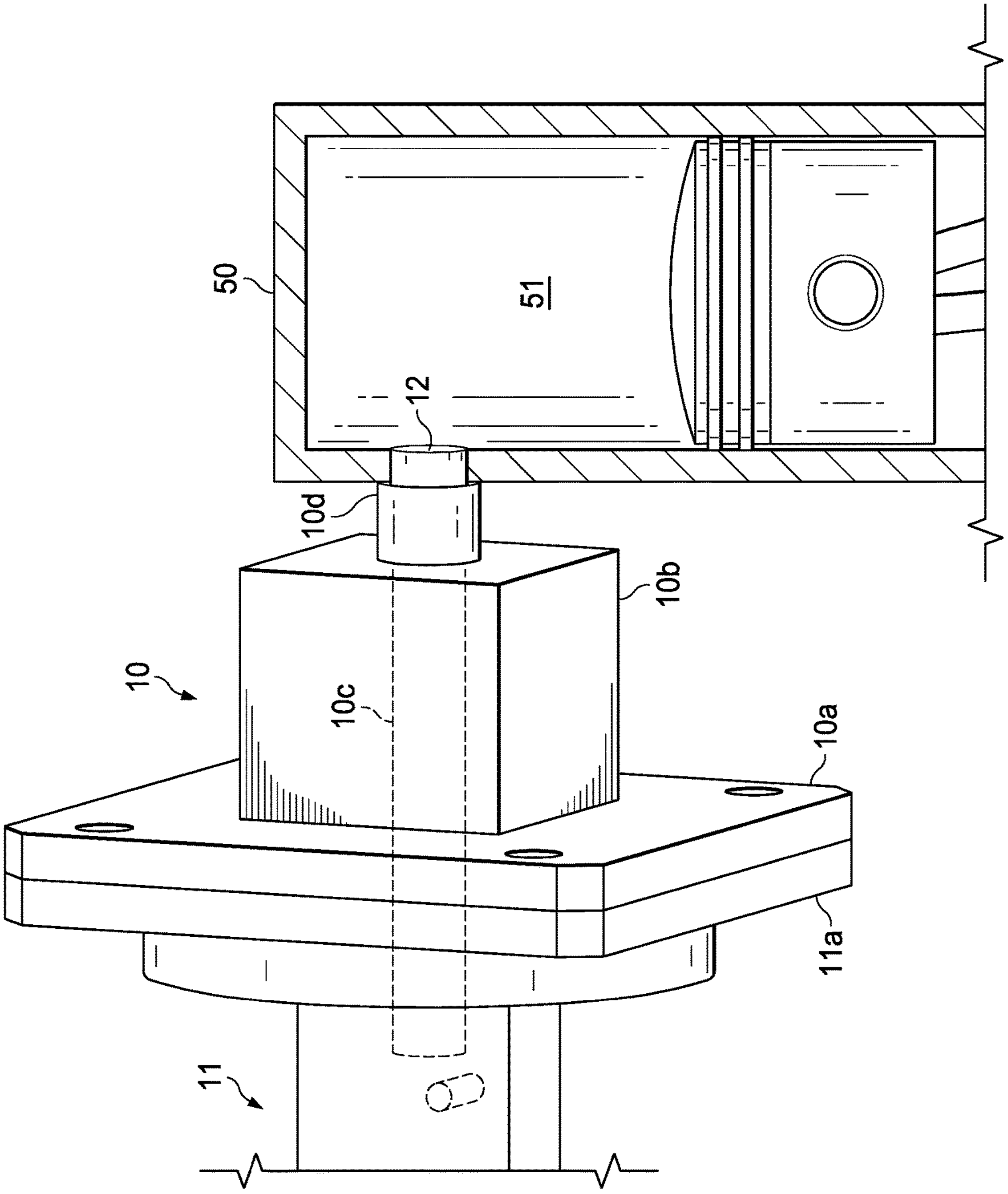
FIG. 5 illustrates an example of an application of the transition—delivery of microwave energy into the combustion chamber of an engine cylinder.

FIG. 5 illustrates an example of an application of transition 10, which is delivery of microwave energy into the combustion chamber 51 of an engine cylinder 50. The transition is arranged such that antenna 12 radiates into the interior of the combustion chamber 51. The microwave energy may then be used for various ignition strategies.

In particular, when antenna 12 may be used to introduce a high-power microwave field into a combustion chamber containing an air-fuel mixture for the purpose of enhancing combustion. Because rod 10*c* functions as an antenna via only its radiating end face, it may be implemented as a small antenna port 12 within the combustion chamber 51. This radiating port 12 may be implemented by fitting the radiating end of rod 10*c* into an aperture in the chamber wall, such that the radiating end (antenna 12) is flush with the inner wall of the chamber. In other embodiments, it may be desired to have the rod 10*d* extend into a combustion chamber. A combustion chamber may be equipped with more than one radiating antenna 12.

What is claimed is:

1. A transition device for transitioning microwaves from an air-filled waveguide to an antenna, the air-filled waveguide having a waveguide attachment flange, comprising:

a transition attachment flange compatible to the waveguide attachment flange;

a rod having an upper portion extending upwardly through the transition attachment flange and waveguide attachment flange, and a lower portion extending downwardly into the air-filled waveguide;

the rod being made from a solid piece of high-dielectric material;

wherein outer surfaces of the upper portion (other than its end face) are metal plated, such that the upper portion provides a solid waveguide having a radiating aperture;

and wherein the lower portion of the rod has no such plating.

2. The transition device of claim 1, wherein the rod is cylindrical.

3. The transition device of claim 1, wherein the rod is made from a ceramic material.

4. The transition device of claim 1, wherein the air-filled waveguide is a rectangular waveguide.

5. The transition device of claim 1, further comprising a support housing surrounding at least part of the upper portion.

6. The transition device of claim 1, wherein the microwaves are in the range of 8 to 12 gigahertz.

7. A combustion chamber antenna system for transitioning and radiating microwaves from an air-filled waveguide into a combustion chamber, the air-filled waveguide having a waveguide attachment flange, comprising:

at least one transition device, comprising: a transition attachment flange compatible to the waveguide attachment flange; a rod having an upper portion extending upwardly through the transition attachment flange and waveguide attachment flange, and a lower portion extending downwardly into the air-filled waveguide; the rod being made from a solid piece of high-dielectric material; wherein outer surfaces of the upper portion (other than its end face) are metal plated, such that the rod provides a solid waveguide having a radiating aperture; wherein the lower portion has no such plating;

wherein the radiating aperture extends into the combustion chamber or is flush with an inner wall of the combustion chamber thereby providing a radiating antenna.

8. The combustion chamber antenna system of claim 7, wherein the rod is cylindrical.

9. The combustion chamber antenna system of claim 7, wherein the rod is made from a ceramic material.

10. The combustion chamber antenna system of claim 7, wherein the air-filled waveguide is a rectangular waveguide.

11. The combustion chamber antenna system of claim 7, further comprising a support housing surrounding at least part of the upper portion.

12. The combustion chamber antenna system of claim 7, wherein the microwaves are in the range of 8 to 12 gigahertz.

13. The combustion chamber antenna system of claim 7, further comprising multiple transition devices and multiple radiating antennas.

14. A method of delivering microwave energy into a combustion chamber from an air-filled waveguide, the air-filled waveguide having a waveguide attachment flange, comprising:

providing at least one transition device, comprising: a transition attachment flange compatible to the waveguide attachment flange; a rod having an upper portion extending upwardly through the transition attachment flange and waveguide attachment flange, and a lower portion extending downwardly into the air-filled waveguide; the rod being made from a solid piece of high-dielectric material; wherein outer surfaces of the upper portion (other than its end face) are metal plated, such that the rod provides a solid waveguide having a radiating aperture; wherein the lower portion has no such plating;

installing each transition device such that the radiating aperture extends into the combustion chamber or is flush with an inner wall of the combustion chamber thereby providing a radiating antenna.

15. The method of claim 14, wherein the rod is cylindrical.

16. The method of claim 14, wherein the rod is made from a ceramic material.

17. The method of claim 14, wherein the air-filled waveguide is a rectangular waveguide.

18. The method of claim 14, wherein the at least one transition device further has a support housing surrounding at least part of the upper portion.

* * * * *